United States Patent [19]

Christophliemk et al.

[11] 4,371,510
[45] Feb. 1, 1983

[54] PROCESS FOR THE CONTINUOUS CRYSTALLIZATION OF ZEOLITIC SODIUM ALUMINOSILICATES OF SMALLEST PARTICLE SIZE

[75] Inventors: Peter Christophliemk, Düsseldorf; Willi Wüst, Ratingen-Hösel; Franz-Josef Carduck, Haan, all of Fed. Rep. of Germany

[73] Assignees: Henkel Kommanditgesellschaft Auf Aktien, Dusseldorf-Holthausen; Degussa Aktiengesellschaft (Henkel KGaA), Frankfurt, both of Fed. Rep. of Germany

[21] Appl. No.: 192,483

[22] Filed: Sep. 30, 1980

[30] Foreign Application Priority Data

Oct. 13, 1979 [DE] Fed. Rep. of Germany ....... 2941636

[51] Int. Cl.³ .............................. C01B 33/28
[52] U.S. Cl. ..................... 423/329; 423/328
[58] Field of Search .............. 423/328–330; 422/188, 191, 193

[56] References Cited

U.S. PATENT DOCUMENTS

| 2,882,243 | 4/1959 | Milton ................................ 423/328 |
| 2,904,607 | 9/1959 | Mattox et al. .................. 423/328 X |
| 3,058,805 | 10/1962 | Weber ................................ 423/328 |
| 4,010,116 | 3/1977 | Secor et al. ..................... 252/455 Z |
| 4,041,135 | 8/1977 | Williams et al. ..................... 423/328 |
| 4,248,847 | 2/1981 | Derleth et al. ................ 423/328 X |

OTHER PUBLICATIONS

"Ullmanns Encycklojädaeder Technischen Chemie" vol. 3, 1973, pp. 342–354.

*Primary Examiner*—Edward J. Meros
*Attorney, Agent, or Firm*—Hammond & Littell, Weissenberger and Muserlian

[57] ABSTRACT

In a process for the production of an aqueous alkaline suspension of low-grit, crystallized zeolitic sodium aluminosilicate of the smallest particle size having the composition.

$$0.9 \text{ to } 1.1 \text{ Na}_2\text{O} \cdot 1 \text{Al}_2\text{O}_3 \cdot 1.8 \text{ to } 2.5 \text{ SiO}_2$$

with a water content depending on the degree of drying, which contains at least 99.8% by weight of a particle size of less than 25 μm and has a high cation exchange capability, comprising crystallization of an aqueous alkaline suspension of an x-ray-amorphous sodium aluminosilicate, said suspension having a composition corresponding to the molar ratios of 1.5 to 5 $\text{Na}_2\text{O}$ : 1 $\text{Al}_2\text{O}_3$ : 1 to 4 $\text{SiO}_2$ : 40 to 400 $\text{H}_2\text{O}$, at elevated temperatures and recovering crystallized zeolitic sodium aluminosilicate, the improvement consisting of feeding the suspension of the x-ray-amorphous sodium aluminosilicate continuously into a crystallizing reactor having progressively, separately zoned mixing areas with a stage-like effect and having at least 20 stages, wherein the suspension flows first through at least 8 stages in the intake part of the reactor, which intake part of the reactor may comprise up to one third of the total reactor volume, maintaining said suspension in the reactor at a preselected temperature in the range of from 80° to 100° C until the degree of crystallization of the zeolitic sodium aluminosilicate, determined by x-ray, has reached at least 80% of the theoretically possible crystallinity, and continuously removing the suspension from the end opposite of the intake end of the reactor.

9 Claims, 1 Drawing Figure

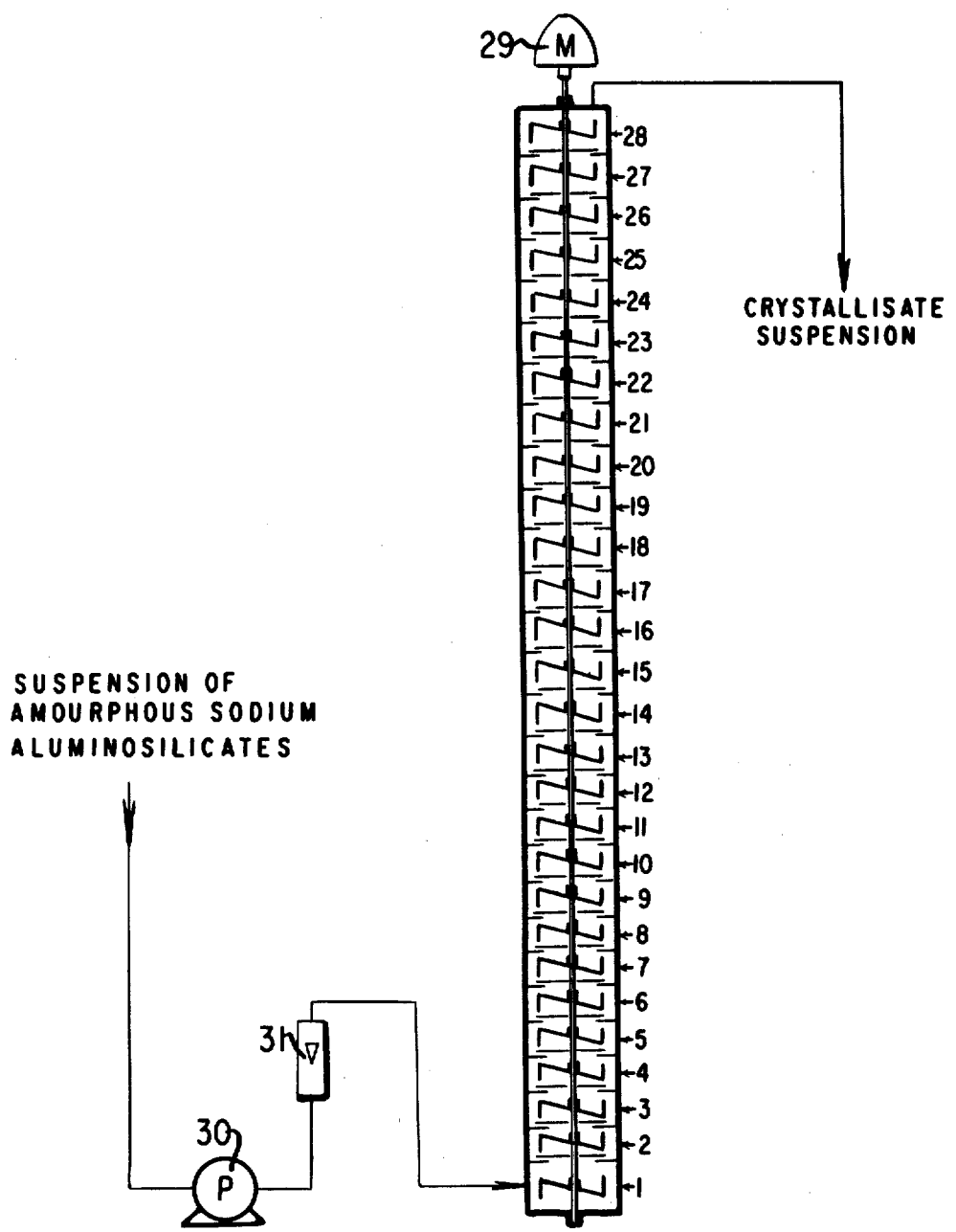

PROCESS FOR THE CONTINUOUS CRYSTALLIZATION OF ZEOLITIC SODIUM ALUMINOSILICATES OF SMALLEST PARTICLE SIZE

BACKGROUND OF THE INVENTION

The subject of the invention is a process for the continuous preparation of an aqueous alkaline suspension of low-grit, crystallized zeolitic sodium aluminosilicate of the smallest particle size by crystallization of an aqueous alkaline suspension of x-ray-amorphous sodium aluminosilicate.

X-ray-amorphous sodium aluminosilicates normally are prepared by the reaction of an aqueous sodium aluminate solution with an aqueous sodium silicate solution in the presence of excess sodium hydroxide solution at temperatures above room temperature. Generally the batch and concentration ranges of the reaction partners in the conventional technology correspond to molar ratios of:

1.5 to 5 $Na_2O$: 1 $Al_2O_3$: 1 to 4 $SiO_2$: 40 to 400 $H_2O$.

Such batch ratios always produce a suspension of an x-ray-amorphous hydrous sodium aluminosilicate with a large excess of sodium hydroxide solution. The amorphous, hydrous solid has a chemical composition corresponding to the molar ratios of 1 to 5 $Na_2O$: 1 $Al_2O_3$: 1.8 to 4 $SiO_2$. After the separation of the mother liquor and rinsing out the excess alkali, x-ray-amorphous products with a chemical composition corresponding to molar ratios of 0.9 to 1.1 $Na_2O$: 1 $Al_2O_3$: 1.8 to 4 $SiO_2$ with a moisture content depending on the degree of drying, can be isolated. The silicate content of the amorphous product is largely determined by the molar ratio of $SiO_2$: $Al_2O_3$ in the reaction batch.

However, instead of such amorphous sodium aluminosilicates, their crystalline and preferably zeolitic products, subsequently obtained, are used for most technical applications. The so-called zeolites form a mineral class of alkali metal aluminosilicates with water of crystallization and with defined pore and spatial structure of their aluminosilicate lattice. "Molecular sieves" are those zeolites of these lattice characteristics that are used, particularly for the separation of substances. Synthetic zeolites are acquiring increasingly technical significance and are utilized as cation exchangers especially for the softening of water, as catalysts in chemical processes, as drying, separation or adsorption agents for solvents and gases, and as heterogeneous inorganic builders in detergents and cleaning agents. Depending on the purpose for which they are to be used, different types, and degrees of dryness and purity are needed. Usually, such molecular sieves first are prepared in their sodium form and then converted into other forms by cation exchange. Molecular sieve NaA is of special importance for most of the mentioned applications. The chemical composition of this type corresponds to the empirical formula:

0.9 to 1.1 $Na_2O$: 1 $Al_2O_3$: 1.8 to 2.5 $SiO_2$: 0 to 6 $H_2O$.

The characteristic x-ray diffraction diagram of this zeolite is described, for example, in the U.S. Pat. No. 2,882,243.

A sodium aluminosilicate of small particle size with a grain size distribution within limits as narrow as possible and a mean grain size below 10 μm is preferred for most technical applications. For the use in detergents and cleaning agents, there is the additional requirement that the proportion of particles having a particle size above 25 μm shall not amount to more than 0.2 percent by weight and that the cation exchange capability shall be as high as possible. The production of particles exceeding 25 μm is determined by wet-screening according to MOCKER (DIN 53 5801) and is called "grit" in the following text. The parameter used to determine the cation exchange capability is the calcium-binding capacity of 1 gm of crystalline sodium aluminosilicate (active substance) per liter of 30° d (German hardness) initial hardness after a reaction time of 10 minutes at room temperature.

The conversion of amorphous sodium aluminosilicate into zeolitic forms is a crystallization process that depends on many parameters and proceeds at a faster rate with increasing temperature. Technically preferred is the crystallization at normal pressure for the preparation of molecular sieve NaA, particularly at temperatures above 70° C. Highly elevated temperatures, for example, far above 100° C. (in autoclaves), generally encourage the formation of other crystalline types of sodium aluminosilicates with strongly reduced cation exchange capability. Depending on the molar ratios in the batch and the temperature, this crystallization step requires times from a few minutes to several days. The crystallization time needed for the preparation of a highly crystalline product of the NaA type in a high volume/time yield, at particularly preferred molar ratios in the batch in the range of 1.5 to 5 $Na_2O$: 1 $Al_2O_3$: 1 to 2.5 $SiO_2$: 60 to 140 $H_2O$ and crystallization temperatures in the range from 70° to 100° C., generally is 15 to 60 minutes. An extended crystallization time is needed to achieve products that are especially low in grit.

Technically amorphous sodium aluminosilicate can be prepared discontinuously as well as continuously. The conversion of this amorphous sodium aluminosilicate into small-sized zeolitic products with a grit content below 0.2 percent by weight, however, can be produced according to the prior art on a technical scale only by a discontinuous method.

OBJECTS OF THE INVENTION

An object of the present invention is to develop a process for the conversion of x-ray amorphous sodium aluminosilicates into crystalline, zeolitic sodium aluminosilicates of smallest size which, on the one hand, permits a continuous process with a high volume/time yield and, on the other, leads to products with the lowest possible grit content and a high cation exchange capability.

Another object of the present invention is the development of the improvement in a process for the production of an aqueous alkaline suspension of low-grit, crystallized zeolitic sodium aluminosilicate of the smallest particle size having the composition 0.9 to 1.1 $Na_2O$ . 1 $Al_2O_3$ . 1.8 to 2.5 $SiO_2$ with a water content depending on the degree of drying, which contains at least 99.8% by weight of a particle size of less than 25 μm and has a high cation exchange capability, comprising crystallization of an aqueous alkaline suspension of an x-ray-amorphous sodium aluminosilicate, said suspension having a composition corresponding to the molar ratios of 1.5 to 5 Na₂O : 1 Al₂O₃: 1 to 4 SiO₂: 40 to 400 H₂O, at elevated temperatures and recovering crystallized zeolitic sodium aluminosilicate, the improvement consisting of feeding the suspension of the x-ray-amorphous sodium aluminosilicate continuously into a crystallizing reactor having progressively, separately zoned mixing areas with a stage-like effect and having at least 20 stages, wherein the suspension flows first through at least 8 stages in the intake part of the reactor, which intake part of the reactor may comprise up to one third of the total reactor volume, maintaining said suspension in the reactor at a preselected temperature in the range of from 80° to 100° C. until the degree of crystallization of the zeolitic sodium aluminosilicate, determined by x-ray, has reached at least 80% of the theoretically possible crystallinity, and continuously removing the suspension from the end opposite of the intake end of the reactor.

These and other objects of the present invention will become more apparent as the description of the invention proceeds.

THE DRAWINGS

The FIGURE is a flow diagram of the process of the invention employing an agitator column with separating trays as a mixed crystallizer having progressively, separately zoned mixing areas.

DESCRIPTION OF THE INVENTION

The above objects have been achieved by the development of a process for the continuous production of an aqueous alkaline suspension of low-grit, crystalline zeolitic sodium aluminosilicates of the smallest particle size and having the composition 0.9 to 1.1 Na₂O: 1 Al₂O₃: 1.8 to 2.5 SiO₂ with a water content dependent on the degree of drying, which contain at least 99.8% by weight of a particle size of less than 25 μm and have a high cation exchange capability, by the crystallization of an aqueous alkaline suspension of x-ray amorphous sodium aluminosilicates, said suspension having a composition corresponding to the molar ratios of 1.5 to 5 Na₂O: 1 Al₂O₃: 1 to 4 SiO₂: 40 to 400 H₂O, at elevated temperatures, which is characterized in (a) that the suspension of the x-ray amorphous sodium aluminosilicate is fed continuously into a crystallizing reactor that has a stage-like effect and/or is constructed in stages and has at least 20 stages in which the suspension flows through at least 8 stages in the intake section of the reactor, which may comprise up to one third of the total reactor volume, (b) that the suspension in the reactor is kept at a temperature of 80° to 100° C. until the degree of crystallization of the zeolitic sodium aluminosilicate determined by x-ray, has reached at least 80% of the theoretically possible crystallinity, and (c) that the suspension is then allowed to pass continuously from the end of the reactor opposite the feeding end.

More particularly, the present invention relates to an improvement in a process for the production of an aqueous alkaline suspension of low-grit, crystallized zeolitic sodium aluminosilicate of the smallest particle size having the composition 0.9 to 1.1 Na₂O . 1 Al₂O₃ . 1.8 to 2.5 SiO₂ with a water content depending on the degree of drying, which contains at least 99.8% by weight of a particle size of less than 25 μm and has a high cation exchange capability, comprising crystallization of an aqueous alkaline suspension of an x-ray-amorphous sodium aluminosilicate, said suspension having a composition corresponding to the molar ratios of 1.5 to 5 Na₂O : 1 Al₂O₃: 1 to 4 SiO₂: 40 to 400 H₂O, at elevated temperatures and recovering crystallized zeolitic sodium aluminosilicate, the improvement consisting of feeding the suspension of the x-ray-amorphous sodium aluminosilicate continuously into a crystallizing reactor having progressively, separately zoned mixing areas with a stage-like effect and having at least 20 stages, wherein the suspension flows first through at least 8 stages in the intake part of the reactor, which intake part of the reactor may comprise up to one third of the total reactor volume, maintaining said suspension in the reactor at a preselected temperature in the range of from 80° to 100° C. until the degree of crystallization of the zeolitic sodium aluminosilicate, determined by x-ray, has reached at least 80% of the theoretically possible crystallinity, and continuously removing the suspension from the end opposite of the intake end of the reactor.

In the sense of the process according to the invention, it is thus very important that the suspension to be crystallized flows continuously through a crystallizing reactor that has a large total number of stages and at least 8 stages in its first part, which may comprise up to one third of the total reactor volume. Here it does not matter whether the crystallizing reactor is constructed in stages, i.e., that it contains discrete stages, and/or has a stage-like effect, since the number of stages of the reactor principally can be set equal to that of a battery of agitator vessels that is equivalent with respect to the holding time distribution. With respect to the dependence of the holding time behavior on the so-called degree of the stage effect of the reactor used as well as the interrelations between the practical and theoretical stage number of multistage reactors, reference is made to applicable textbooks of chemical technology, such as "Ullmann's Encyklopadie der technischen Chemie," 4, Auflage, Band 3 (4th edition, Volume 3); "Verfahrenstechnik II and Reaktionsapparate" 1973, Verlag Chemie, pp. 342 to 354, incorporated herein by reference.

In general, the stage number of a continuously operating reactor can be considered a measure of the amount in which portions of the product are ahead of the main front of the product or flow back with respect to it, and thus a measure of the mixing in the direction of the flow. The greater the number of stages in the reactor, the lower the extent of mixing between the individual volume elements of the suspension to be crystallized in the flow direction. In the process according to the invention, the suspension crystallizes in the flow direction. In the intake section of the reactor, the suspension of the amorphous sodium aluminosilicate is fed in continuously, at the outlet, the suspension of the crystallized sodium aluminosilicate is discharged continuously. A reduced mixing of the volume elements in the flow direction thus means a reduced interaction of sodium aluminosilicate particles of different degrees of crystallinity.

It was surprising to observe that it is very important in the sense of the process according to the invention that the back-mixing of already crystallized product with amorphous product, especially in the first third of the crystallizing section, be suppressed or that the interaction of sodium aluminosilicate particles of higher crystallinity with those of lower crystallinity is prevented as much as possible.

In this way the process according to the invention results in crystalline zeolitic sodium aluminosilicates of the smallest particle size, which are characterized by a very small amount of grit and a narrow grain spectrum with a low mean grain size, on the one hand, and by a high cation exchange capability, on the other. Furthermore, the high volume/time yield that can be achieved by this continuous process is of special advantage. In this sense it is preferable, according to the invention, that the suspension is allowed to flow into the reactor with a throughput in the range from 1 to 4 cubic meters of suspension per cubic meter of reactor volume and per hour.

The crystallizing reactors used in the sense of the invention are those reactors that permit a continuous introduction of the amorphous suspension as well as a continuous removal of the crystallized suspension and have the required stage distribution of stages. Such reactors are known and are described in textbooks of chemical technology, such as in the "Ullmann" volume cited above.

The precipitation temperature of the amorphous suspension generally lies below the required crystallization temperature so that the suspension must be heated for the crystallization. This heating can be indirect or also by injecting steam into the suspension. According to the invention, it is preferable that the suspension is heated to the desired crystallization temperature by steam injection, either before feeding into the crystallizing reactor, or in the first stage of the reactor. If a lowering of the precipitation temperature to the desired crystallization temperature is necessary, this can be achieved by feeding through heat exchangers connected to the crystallizing reactor.

The respective crystallization reactor, as well as the feeding line for the amorphous suspension, may be enclosed entirely or partially by a heating mantle for steam, hot water or other conventional heat exchange media. The continuous crystallization can be carried out largely isothermically in this manner, that is, with a tolerance of ±2° C. In the sense of the process according to the invention, the suspension preferably is crystallized at a temperature that is constant, preferably in the range from 85° to 95° C., except for deviations ±2° C.

The total volume of the crystallizing reactor to be used, and thus also its dimensions, are determined by the desired throughput of the suspension to be crystallized.

Flowing tube reactors and/or agitator columns are preferred as crystallizing reactors to carry out the process according to the invention.

With the flowing tube reactor, the reaction volume is formed by a tube which usually is very long in comparison to its diameter. The reactants enter the tube at one end, and the final mixture is removed at the other end. In the ideal flowing tube reactor, no mixing takes place between the individual volume elements of the reaction mixture, in the direction of the flow, and the composition of the reaction mixture is constant across the cross section, at any place in the tube. These conditions can be described in a first approximation by postulating a so-called piston or plug flow. The changes in concentration along the tube (i.e., mixing) are depending on the throughput.

The distribution of the holding time of an actual flowing tube reactor differs from that of an ideal tube and is dependent on the REYNOLDS number, tube bends, tube profile, tube baffles, inside surface roughness, flow conditions at the intake and outlet of the tube, differences in the viscosity of the reaction mixture and similar parameters. Knowledge about the holding time in a given tube reactor can be obtained either by measuring or by choosing the operating conditions so that they are largely ideal.

Data on the construction and operation of flowing tube reactors including their mathematical treatment, can be found in textbooks on chemical technology, such as in the above-cited "Ullmann" volume.

In a preferred form of execution of the process according to the invention, the suspension is allowed to flow through a flowing tube reactor which has a ratio of tube length to tube diameter in the range from 3,000 to 7,000, preferably 5,000.

Agitator columns consist of a cylindrical reactor, which is subdivided by partitions into chambers of preferably equal size. This type of reactor sometimes is also called "chamber reactor" in the literature. In analogy to distillation columns, the partitions in agitator columns also are called "trays". Equally analogous is the definition of the stage number as product of (actual) number of trays and degree of stage effectiveness.

The agitators for the individual chambers are all mounted to a shaft in the axis of the tube. The bearings usually are at the end. An intermediate bearing makes technical sense only with especially long agitator shafts. The design of the agitators with respect to agitator type, size, power consumption, circuit breaker and similar factors can vary widely. The calculation of the mean holding time and concentration of the reactants in an agitator column is identical with that for a block of agitator tanks of the same number of stages. However, higher stage numbers can be realized with lower expenditures by using an agitator column. The liquid in agitator columns flows from chamber to chamber, through openings in the trays. Agitator columns can be operated with any desired spatial orientation, i.e., vertically, horizontally or inclined. However, they are preferably operated in vertical position, flooded with liquid flowing from the top to the bottom or with liquid flowing from the bottom to the top. Details and special arrangements can be found in textbooks of chemical technology.

According to another preferred form of execution of the process according to the invention, the suspension is allowed to flow through an agitator column with chambers separated by intercalated plates, with the space separating the plates lying in the range of 0.35 to 0.7 times the inside diameter of the agitator column.

According to a third preferred form of execution of the process according to the invention, a combination consisting of a tube reactor and an agitator column, as they were described above, is used as crystallizing reactor. Thus the suspension is allowed to flow through a tube reactor and subsequently through an agitator column attached to the former.

The low-grit, zeolitic sodium aluminosilicate of smallest particle size prepared in a continuous operation according to the invention is worked up after the completion of the crystallization. For this, the crystalline solid is filtered off. Depending on the requirements of the application technology, it is then washed and dried and, if desired, finished in some other conventional manner. Mother liquors and waste water can be recycled into the process.

Because of the high cation exchange capability of the obtained zeolitic sodium aluminosilicate, which is expressed in a calcium-binding capacity in the range from 150 to 200 mg CaO/gm active substance, these compounds, and especially the molecular sieve NaA, can be used advantageously as heterogeneous inorganic builders (phosphate substitutes) in detergents, rinsing and cleaning agents.

The performance of the process according to the invention is described in more detail in the following examples, which are not limitative of the invention in any way.

EXAMPLES

A flowing tube reactor with a total volume of about 200 liters and a tube diameter (inside) of 38 mm was used to carry out Examples 1a–1d. 44 U-shaped bends spaced at intervals of about 4 meters apart made the reactor compact and the reactor required a floor space of only 20 square meters. The flowing tube reactor was completely enclosed in a heating mantle (hot water), which was subdivided into a total of 10 zones for variable in heating (always the indicated crystallization temperature in the examples). A cross-section of a flowing tube reactor is shown in the drawing in copending, commonly assigned Ser. No. 127,383, filed Mar. 5, 1980, now U.S. Pat. No. 4,278,649.

An agitator column with an effective working capacity of about 200 liters was used for the Examples 2a–2d. The agitator column had a total length of 3.70 m and was filled from the bottom to the top. A total of 28 chambers was formed by 27 intercalated plates (see the FIGURE). The chambers 2 to 12 in the intake section were 11 cm high, the chambers 13 to 27, in contrast, were 14 cm (always inside height). Chambers 1 and 28 (reactor intake and outlet, respectively) contained the agitator bearings and thus were designed somewhat larger (about 15 cm high). The intercalated plates had concentric apertures with a diameter of 0.5 times the inside column diameter; the disks located above at intervals of about 1 mm each had a diameter of 0.7 times the inside column diameter (inside column diameter 27 cm). The agitator shaft carried the agitators for each of the chambers (MIG-agitator, manufactured by EKATO; agitator diameter: 0.7×inside column diameter). The agitator speed was infinitely variable to an agitator speed of 480 rpm at the agitator motor 29. All crystallization examples were carried out at a constant agitator speed of 312 rpm. The entire column was heated (3 zones) by a mantle with steam corresponding to the given crystallization temperature. The throughput was regulated by the pump 30 and measured with a flow meter for suspended suspensions 31.

The suspensions A and B of x-ray-amorphous sodium aluminosilicate with the total molar ratios A: 3.6 Na$_2$O: 1 Al$_2$O$_3$: 1.8 SiO$_2$: 80 H$_2$O B: 4.4 Na$_2$O: 1 Al$_2$O$_3$: 1.8 SiO$_2$: 100 H$_2$O used in the following examples were prepared in a continuous process with 2,492 and 2,664 kg, respectively, per hour, according to the data of our U.S. Pat. No. 4,267,158, Example 5f and 5i, respectively. The partial streams needed for the following crystallization examples were removed from this product stream and led directly into the flowing tube reactor or agitator column. The suspensions were heated from the precipitation temperature (65°±2° C.) to the given crystallization temperatures by continuous injection of steam immediately before introduction into the crystallizing reactor. The water content in the suspension was thereby increased by approximately 3 to 5 mols of H$_2$O per mol of Al$_2$O$_3$.

For the analysis of the crystal mass, samples of the product were washed free from alkali and dried overnight at 100° C. in the vacuum drying oven, well ground and identified by their x-ray diffraction diagram. The composition with respect to Na$_2$O and Al$_2$O$_3$ was determined by x-ray fluorescence analysis. The loss on heating for one hour at 800° C. is given as the water content. The crystal habit was determined by the scanning electron microscope; the grain size distribution was measured by Coulter Counter ®; and the wet-screening residue according to MOCKER (grit) was determined with the use of a 25-μm screen according to DIN 53580 (1 gm of active substance was slurried in 100 ml deionized water, homogenized for 1 minute in the ultrasonic bath, wet-screened for 5 minutes with a water pressure of 4 bar and a flow rate of 400 liters of water per hour and the dried screen was reweighed).

The calcium-binding capacity (CaBc) of the dried products was determined according to DE-OS No. 24 12 837 (page 27) at 22°±2° C. with 1 gm of active substance per liter and 30° d (German hardness) initial hardness, after 10 minutes and recorded correspondingly as "mg CaO/gm AS" (AS=active substance).

The conditions for the crystallizing of the initial suspensions into low-grit, zeolitic sodium aluminosilicate of smallest particle size by using the described crystallizing reactors as well as the resulting product characteristics can be found in the following table. Highly crystalline sodium aluminosilicate of the type NaA with rounded edges (crystallite diameter < 1.5 μm), without any crystalline contaminations, was always formed under these conditions.

Explanations for the table:
(a) Suspension of amorphous sodium aluminosilicate with varying total molar ratios corresponding to A and B as given above;
(b) throughput, including the water vapor used for heating to crystallization temperature, which was incorporated by condensation, in kg per hour;
(c) temperature, constant within the crystallizing reactor to ±2° C.;
(d) NaA content determined by x-ray by comparison of the strongest x-ray reflections with standards;
(e) grit, in percent by weight with respect to active substance.

TABLE

Conditions for the crystallization of the suspensions A and B in the flowing tube reactor (Examples 1a–1d) and in the agitator column (Examples 2a–2d) and the resulting product characteristics

| Example Nr. | Conditions of Crystallization | | | Product Characteristics | | | |
|---|---|---|---|---|---|---|---|
| | Suspension (a) | Throughput (b) | Temperature (c) | % NaA (d) | CaBc | Grit (e) | Mean particle size in μm |
| 1a | A | 330 | 92 | .80 | 150 | 0.15 | 4.5 |
| b |   | 280 | 88 | 85 | 155 | 0.10 | 5.2 |
| c | B | 310 | 94 | 90 | 160 | 0.08 | 4.2 |
| d |   | 270 | 90 | 90 | 165 | 0.05 | 5.0 |
| 2a | A | 400 | 93 | 85 | 150 | 0.11 | 5.0 |
| b |   | 250 | 85 | 95 | 165 | 0.19 | 5.5 |
| c | B | 420 | 95 | 100 | 170 | 0.02 | 4.8 |
| d |   | 350 | 88 | 100 | 175 | 0.14 | 5.4 |

The preceding specific embodiments are illustrative of the practice of the invention. It is to be understood, however, that other expedients known to those skilled in the art or disclosed herein, may be employed without departing from the spirit of the invention or the scope of the appeneded claims.

We claim:

1. In a process for the production of an aqueous suspension of low-grit, crystallized zeolitic sodium aluminosilicate of the smallest particle size having the composition $$0.9 \text{ to } 1.1 \text{ Na}_2\text{O} . 1 \text{ Al}_2\text{O}_3 . 1.8 \text{ to } 2.5 \text{ SiO}_2$$

with a water content depending on the degree of drying, which contains at least 99.8% by weight of a particle size of less than 25 μm and has a high cation exchange capability, comprising crystallization of an aqueous alkaline suspension of an x-ray-amorphous sodium aluminosilicate, said suspension having a composition corresponding to the molar ratios of $$1.5 \text{ to } 5 \text{ Na}_2\text{O}: 1 \text{ Al}_2\text{O}_3: 1 \text{ to } 4 \text{ SiO}_2: 40 \text{ to } 400 \text{ H}_2\text{O}$$

at elevated temperatures and recovering crystallized zeolitic sodium aluminosilicate, the improvement consisting of feeding the suspension of the x-ray-amorphous sodium aluminosilicate continuously into a crystallizing reactor having progressively, separately zoned mixing areas with a stage-like effect and having at least 20 stages, wherein the suspension flows first through at least 8 stages in the intake part of the reactor, which intake part of the reactor may comprise up to one third of the total reactor volume, maintaining said suspension in the reactor at a preselected temperature in the range of from 80° C. to 100° C. until the degree of crystallization of the zeolitic sodium aluminosilicate, determined by x-ray, has reached at least 80% of the theoretically possible crystallinity, and continuously removing the suspension from the end opposite of the intake end of the reactor where said suspension of the x-ray-amorphous sodium aluminosilicate is continuously fed into said crystallizing reactor and continuously removed at a throughput in the range of from 1 to 4 cubic meters of suspension per cubic meter of reactor volume and per hour, and said suspension of the x-ray-amorphous sodium aluminosilicate is below said preselected crystallization temperature and is heated by steam injection to said preselected crystallization temperature before it leaves said intake part of the reactor.

2. The process of claim 1 wherein said heating by steam injection occurs before said suspension is introduced into said crystallizing reactor.

3. The process of claim 1 wherein said preselected temperature in said crystallizing reactor is maintained constant in the range of from 85° to 95° C. with a deviation of ±2° C.

4. The process of claim 1 wherein said suspension of the x-ray-amorphous sodium aluminosilicate is continuously fed into the entrance of an elongated substantially circular cross-sectional reaction zone having a ratio of length to diameter of from 3000 to 7000, as said reactor having progressively, separately zoned mixing areas.

5. The process of claim 4 wherein the ratio of length to diameter is about 5000.

6. The process of claim 1 wherein said suspension of the x-ray-amorphous sodium aluminosilicate is continuously fed into an agitated vertical column divided by trays into separated, agitated chambers, fluidly interconnected with the next adjacent chambers, as said reactor having progressively, separately zoned mixing areas.

7. The process of claim 6 wherein the height of said separated, agitated chambers is from 0.35 to 0.7 times the inside longest cross-section dimension of said chamber.

8. The process of claim 7 wherein said separated, agitated chambers have a circular cross-section.

9. The process of claim 1 wherein said reactor having progressively, separately zoned mixing areas is a combination of an elongated, substantially circular cross-sectional reaction zone having a ratio of length to diameter of from 3000 to 7000 followed by an agitated vertical substantially cylindrical column divided by trays into separated, agitated chambers fluidly interconnected with the next adjacent chambers.

* * * * *